(12) United States Patent
Eitel et al.

(10) Patent No.: US 7,368,061 B2
(45) Date of Patent: May 6, 2008

(54) PROCESS AND DEVICE FOR THE PRODUCTION OF ELASTOMER-MODIFIED THERMOPLASTICS

(75) Inventors: Alfred Eitel, St. Johann (AT); Haakan Jonsson, Cranberry Township, PA (US); Ulrich Liesenfelder, Bergisch Gladbach (DE); Stefan Moss, Haan (DE); Ricarda Nothelle, Shanghai (CN); Andreas Frankenau, Kempen (DE); Stephen Böhmer, Pulheim (DE)

(73) Assignee: Lanxess Deutschland GmbH, Leverkusen (DE)

( * ) Notice: Subject to any disclaimer, the term of this patent is extended or adjusted under 35 U.S.C. 154(b) by 0 days.

(21) Appl. No.: 10/825,886

(22) Filed: Apr. 16, 2004

(65) Prior Publication Data
US 2005/0014897 A1    Jan. 20, 2005

(30) Foreign Application Priority Data
Apr. 22, 2003    (DE) ............................... 103 18 109

(51) Int. Cl.
*C08L 51/04*    (2006.01)
(52) U.S. Cl. .................... 210/767; 210/773; 264/68; 525/67; 525/68; 525/69; 525/70; 525/80; 525/84
(58) Field of Classification Search .................. 366/79; 525/84, 67, 68, 69, 70, 80; 210/767, 773; 264/68
See application file for complete search history.

(56) References Cited

U.S. PATENT DOCUMENTS

| | | | |
|---|---|---|---|
| 3,918,690 A | 11/1975 | Coscia | 259/191 |
| 3,998,797 A | 12/1976 | Brandli et al. | 528/487 |
| 4,013,739 A | 3/1977 | Bracke et al. | |
| 4,338,405 A * | 7/1982 | Saxton | 525/62 |
| 5,691,445 A | 11/1997 | Krupinski et al. | 528/483 |
| 5,851,463 A | 12/1998 | Guntherberg et al. | 264/101 |
| 5,910,276 A | 6/1999 | Guntherberg et al. | 264/101 |
| 6,153,692 A | 11/2000 | Liesenfelder et al. | 525/53 |
| 6,465,570 B1 | 10/2002 | Liesenfelder et al. | 525/53 |
| 2002/0111435 A1 | 8/2002 | Gasche et al. | 625/243 |

FOREIGN PATENT DOCUMENTS

EP    768 337    6/2000

\* cited by examiner

*Primary Examiner*—Jeffrey Mullis
(74) *Attorney, Agent, or Firm*—Jennifer R. Seng

(57) ABSTRACT

A continuous process for the production of an elastomer-modified thermoplastic is disclosed. The process entails (i) obtaining graft elastomer (D) having residual moisture content of 1 to 50 wt. %, particularly 5 to 50 wt. %, particularly preferably 10 to 40 wt. %, (ii) introducing (D) and thermoplastic resin (B) through an inlet to a reactor operating under conditions calculated to melt (D) and (B) and to remove organic volatile components C) to produce a molten blend, the reactor being equipped with a plurality of kneading bars, that convey a portion of the molten blend towards the reactor inlet.

8 Claims, 2 Drawing Sheets

PROCESS AND DEVICE FOR THE PRODUCTION OF ELASTOMER-MODIFIED THERMOPLASTICS

FIELD OF THE INVENTION

The present invention concerns thermoplastic molding compositions and in particular compositions having low content of residual monomers and device for their production.

SUMMARY OF THE INVENTION

A continuous process for the production of an elastomer-modified thermoplastic is disclosed. The process entails (i) obtaining graft elastomer (D) having residual moisture content of 1 to 50 wt. %, particularly 5 to 50 wt. %, particularly preferably 10 to 40 wt. %, (ii) introducing (D) and thermoplastic resin (B) through an inlet to a reactor operating under conditions calculated to melt (D) and (B) and to remove organic volatile components C) to produce a molten blend, the reactor being equipped with a plurality of kneading bars, that convey a portion of the molten blend towards the reactor inlet.

BACKGROUND OF THE INVENTION

Polymers always have a residual content of monomers from which they are synthesized, and an inherent color. The removal of the residual monomers from the molding compositions frequently involves exposure to high temperatures, which leads to an undesirable intensification of the inherent color. In order to improve the properties it is essential to remove the residual monomers in a suitable way.

In practice a light inherent color is generally desirable. In the case of colored products this also generates an economic benefit, because the amount of dye needed for coloration may be reduced rather than having to be increased in order to conceal a yellowish inherent color.

A removal of residual monomers by the chemical route is described for example in EP-A1-0 768 337. Here the residual monomers are removed by addition of CH-acid organic compounds. Through this known process monomers such as styrene and acrylonitrile can be removed reliably, but not solvents or secondary polymerization products. The same deficiency occurs in the process to reduce residual monomers with alkali (bi)sulfide (DE-A1-2 546 182). In some circumstances, however, the chemical transformation of residual monomers leads to products having an undesirable ecological relevance, which significantly complicates the use of these products in practice.

In another known process the residual monomers are removed under vacuum in an additional process step in extruders with or without the addition of water. The additional process step leads to higher costs and to a further undesirable deepening of the product color.

A process for the removal of residual monomers by injection of supercritical solvents into the polymer melt (EP-A1-0 798 314) has proven costly.

Another process for the production of elastomer-modified thermoplastics is described in EP-A1-0 867 463. Wet polybutadiene powder grafted with styrene and acrylonitrile and containing residual monomers is blended with polystyrene-acrylonitrile melt in a mixing compounder and freed from residual monomers with simultaneous evaporation of the water. The finished ABS is discharged from the end of the evaporating equipment and converted into pellet form. The disadvantage of this process is that the achievable throughput is limited. With a high throughput the powder is to a considerable extent not incorporated into the melt but entrained with the vapors. This leads to loss of yield and to unstable operating conditions. To counteract this mode of operation of the mixing compounder can be adjusted so that a back-up of melt is generated at the exit from the mixing compounder. This melt is supposed to bind the powder and prevent it from being discharged. This procedure is only of limited use, however.

Starting from this known process, the object of the present invention is to provide a process that does not have the disadvantages described.

DETAILED DESCRIPTION OF THE INVENTION

Figure 1:
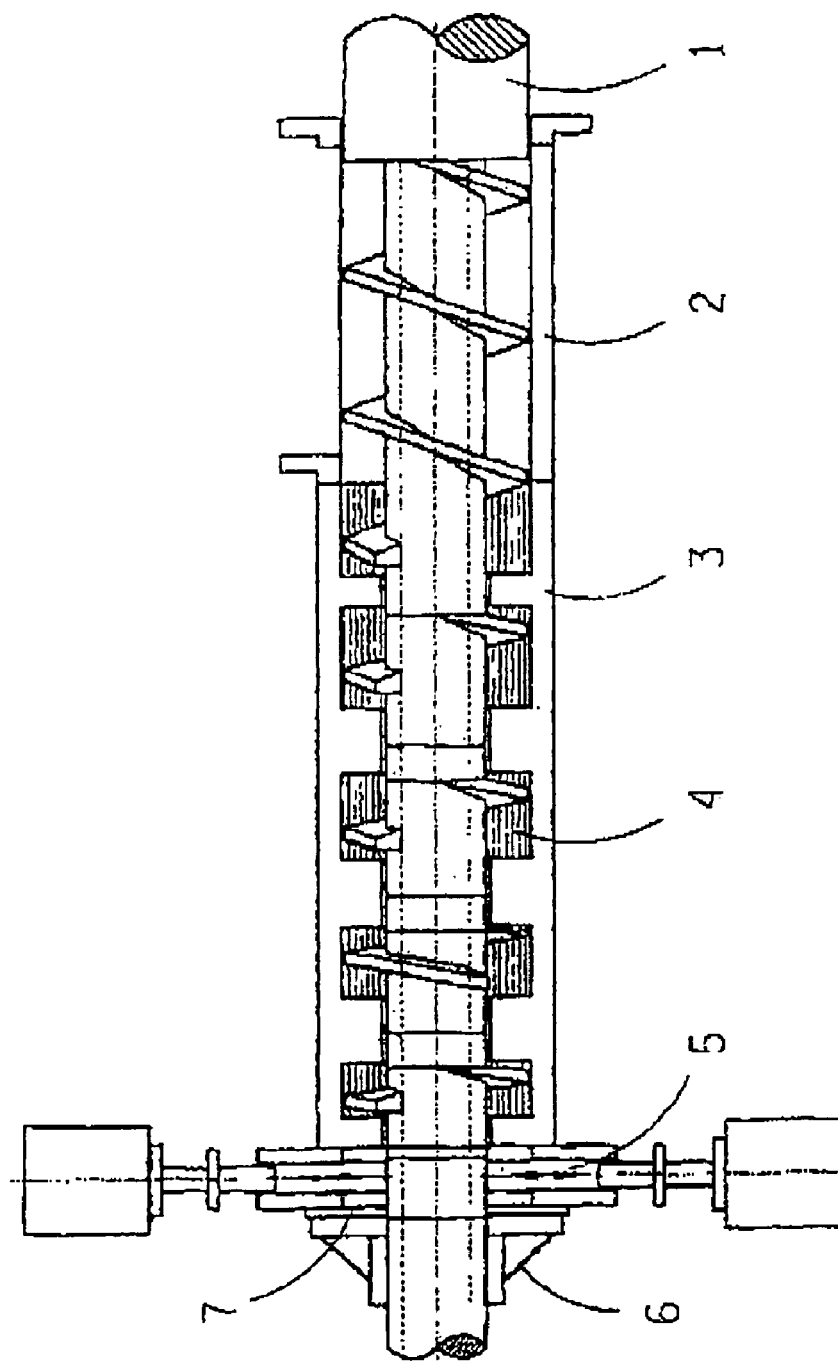
FIG. 1 shows a schematic longitudinal cross section of a preferred design for a strainer screw.

The invention provides a continuous process for the production of an elastomer-modified thermoplastic comprising (i) obtaining graft elastomer (D) that includes a grafted phase (A), said (D) having residual moisture content of 1 to 50 wt. %, particularly 5 to 50 wt. %, particularly preferably 10 to 40 wt. %, (ii) introducing (D) and thermoplastic resin (B) through an inlet to a compounding reactor operating under conditions calculated to melt (D) and (B) and to remove organic volatile components C) to produce a molten blend the reactor being equipped with a plurality of kneading bars, that convey a portion of the molten blend towards the reactor inlet.

The terms "mixing compounder" and "compounding reactor" are used as synonyms herein.

An embodiment of the process is preferred in which the energy that is required to melt, heat and evaporate the polymer mixture is introduced mechanically via the kneading action of the rotors and thermally via the surfaces of a compounding reactor housing, the ratio between the mechanical and thermal energy to be introduced into the mixture being 4:1 to 1:6, particularly 2.5:1 to 1:4.

The process is preferably performed in a large-volume, partially filled compounding reactor with rotating fittings, i.e. rotating means for mixing or blending compounds. The throughput of polymer per liter of processing capacity is no more than 5 kg/h.

Particularly preferred is a process which is characterized in that dyes and/or additives are also added during the mixing of grafted elastomer D) and thermoplastic B).

Dyes and/or additives are particularly preferably added to the polymer mixture in a static mixer connected in series to the compounding reactor.

According to one variant the process is preferably performed in a compounding reactor with compounding reactor fittings. i.e. means for mixing or blending compounds. The specific drive input of the compounding reactor fittings is 0.01 to 1 kWh per kg of dry polymer melt, preferably 0.05 to 0.5 kWh/kg and particularly preferably 0.05 to 0.25 kWh/kg.

A process is preferred that is characterized in that initial dewatering of the elastomer D) takes place in a centrifuge, a dewatering extruder or in a sequence of the two units.

The initial dewatering particularly preferably occurs in a continuous pressing device, optionally with a variable retarding device, i.e. adjustable means for retarding the melt flow, particularly in an extruder.

The initial dewatering is performed in particular at a temperature below the glass transition temperature of the thermoplastic A), preferably below 90° C.

An energy of 0.016 to 0.05 kWh/kg of polymer, preferably 0.018 to 0.03 kWh/kg of polymer, is particularly preferably used for the initial dewatering.

The water content of the product of the initial dewatering is 1 to 50 wt. %, particularly 5 to 50 wt. %, particularly preferably 10 to 40 wt. % relative to the weight of (D). In particular, if the initial dewatering of the elastomer D) takes place in a centrifuge with a drainage screw connected in series, the residual moisture content of the elastomer D) after the initial dewatering is 10 to 23 wt. %, particularly preferably 16 to 21 wt. % relative to the weight of (D).

A process for the production of thermoplastics is known from EP-A1-0 734 825 in which water is pressed out of an elastomer component in a Werner & Pfleiderer ZSK extruder and the use of a strainer screw is expressly described as being susceptible to failure. Mention is also made there of the fact that the evaporation of large amounts of water is expensive.

Contrary to the prevailing thoughts, in the present invention water is successfully pressed out with a strainer screw and advantage taken of the cleaning action by means of water vapor distillation in a suitable downstream unit after the elastomer component (D) is combined with the rubber-free component (B). The use of two items of equipment increases the flexibility of the process according to the invention.

Any polymer that has elastomeric properties and may be fed to an extruder may be used as an elastomer in the process according to the invention. Preferably used as elastomers D) are rubbers. Elastomers D), preferably rubbers, are grafted with a thermoplastic A). Suitable rubbers are e.g. nitrile rubbers or partially saponified nitrile rubbers. Particulate rubbers are used in particular.

Preferred graft polymers D) are for example styrene-grafted polybutadienes, butadiene/styrene copolymers, e.g. copolymers of the type described in DE-A1-1 694 173; acrylonitrile, styrene and/or alkyl styrene grafted polybutadienes, butadiene/styrene or butadiene/acrylonitrile copolymers, polyisobutenes or polyisoprenes, such as are described for example in DE-A1-2 348 377.

Particularly preferred graft polymers D) are ABS polymers including such as are described for example in DE-A1-2 035 390 or DE-A1-2 248 242.

Suitable elastomers D) (graft polymers) for performing the process according to the invention are graft polymerized vinyl compounds such as e.g. styrene, α-methyl styrene, acrylonitrile, methyl methacrylate and alkyl acrylate or mixtures thereof; particularly preferred are methyl methacrylate and mixtures of styrene and acrylonitrile, of α-methyl styrene and acrylonitrile, of methyl methacrylate and styrene, of methyl methacrylate and alkyl acrylate, of α-methyl styrene, methyl methacrylate and acrylonitrile. Rubbers which are used as preferred graft bases are diene homopolymers and copolymers of e.g. butadiene, isoprene, chloroprene, optionally with up to 35 wt. % of comonomers such as styrene, acrylonitrile, methyl methacrylate, alkyl acrylate, vinyl methyl ether, or alkyl acrylate polymers (in particular of $C_1$-$C_{10}$ alkyl acrylates), which optionally contain up to 20 wt. % of vinyl monomers incorporated by polymerisation, such as styrene, acrylonitrile, vinyl acetate, $C_1$-$C_{10}$ alkyl methacrylate; the acrylate rubbers are optionally partially crosslinked by the incorporation by polymerisation of polyfunctional vinyl or allyl monomers; crosslinking monomers are for example bis-acrylates, bis-acrylamides, butadiene, acrylic acid vinyl esters, triallyl cyanurate, trialkyl isocyanurate, citric acid trisallyl esters, bis-carboxylic acid vinyl esters.

Further examples of suitable rubbers are acrylate rubbers. Including acrylate rubbers that contain crosslinking monomers in quantities of up to a maximum of 5 wt. %. The rubbers may also have a core/shell structure, i.e. the acrylate rubber particles contain a rubber core that differs structurally from the acrylate rubber surrounding it or a hard thermoplastic resin core. In particular, stages comprising one or more of the monomers styrene, alkyl styrene, acrylonitrile, methyl methacrylate can be polymerised. Graft polymers on the basis of butadiene/styrene/acrylonitrile, n-butyl acrylate/styrene/acrylonitrile, butadiene/n-butyl acrylate/styrene/acrylonitrile, n-butyl acrylate/styrene/methyl methacrylate, butadiene/styrene/acrylonitrile/methyl methacrylate and butadiene/n-butyl acrylate/methyl methacrylate/styrene/acrylonitrile are preferred.

According to the invention, graft polymers (elastomer D) are mixed with thermoplastics B), in particular styrene-acrylonitrile (SAN) copolymers, polystyrene, polymethyl methacrylate, polyvinyl chloride or mixtures of these polymers, to produce elastomer-modified thermoplastics.

SAN polymers, polymethyl methacrylate (PMMA) or mixtures of these polymers are particularly preferred as thermoplastic B). Copolymers that are particularly preferably used are obtained from 20 to 40 wt. % acrylonitrile and 80 to 60 wt. % styrene or α-methyl styrene. They are known and may be produced by radical polymerisation e.g. in emulsion, suspension, solution or bulk. The copolymers preferably have a molecular weight $M_w$ of 15,000 to 200,000 (weight average, determined by light scattering or sedimentation).

Furthermore, polycarbonate, polybutylene terephthalate, polyoxymethylene, polymethyl methacrylate, polyphenylene sulfide, polysulfones, polyether sulfones and polyamides and mixtures of these thermoplastics may also be used as thermoplastics B).

The graft polymers D) may be produced by known processes such as suspension or emulsion processes. The vinyl polymer latices may be produced for example in the known way by emulsion polymerisation in aqueous media or by emulsion graft polymerisation in the presence of rubber latices. In the case of rubber-free polymers the monomers are radically polymerized in the presence of soaps (emulsifiers) in the aqueous medium at pH values of around 12 to 2, in particular 10 to 3. Suitable initiators are in particular water-soluble radical formers such as peroxodisulfates, peroxodiphosphates, water-soluble hydroperoxides and peroxo acids, as well as redox initiator systems. The polymerization, which is normally performed at 40 to 90° C., requires the presence of an ionic emulsifier, in particular an anionic emulsifier, in quantities of up to 4 wt. %, preferably up to 2.5 wt. %, relative to the monomers. Suitable emulsifiers are for example fatty acid salts, alkyl sulfonic acid salts having longer-chain alkyl radicals and sulfuric acid alkyl semiesters having longer-chain alkyl radicals, as well as preferably alkali salts of disproportionated abietic acid.

It is known that in graft polymerization the graft monomers are not completely polymerized onto the graft base; according to the invention, however, graft polymers D) include products that are obtained by polymerization of the graft monomers in the presence of the graft base.

The vinyl polymer latices produced in this way have in general a polymer solids content of 10 to 70 wt. %, preferably 25 to 50 wt. %. The content of unpolymerized monomers in the latex is generally 0 to 15 wt. %, preferably 0 to 5 wt. %, relative to the polymer solids content of the latex. The size of the vinyl polymer latex particles is 50 to 1000 nm, preferably 80 to 650 nm.

Graft rubbers with rubber contents of at least 50 wt. %, preferably at least 55 wt. %, are particularly preferred.

Particularly preferred graft polymers D) are obtained by graft polymerization of 30 to 90 wt. %, preferably 50 to 85 wt. %, in particular 60 to 80 wt. %, relative to graft polymer D), of a butadiene polymer with at least 50 wt. % butadiene radicals (as graft base).

In addition to butadiene radicals the butadiene polymer may contain up to 50 wt. % of radicals of other ethylene-unsaturated monomers, such as styrene and acrylonitrile, polybutadiene being preferred.

The gel content of the graft base is generally at least 20 wt. % (measured in toluene), the degree of grafting G 0.15 to 0.55. The gel content of the graft base is determined in dimethyl formamide at 25° C. (M. Hoffmann, H. Krömer, R. Kuhn, Polymeranalytik I and II, Georg-Thieme-Verlag, Stuttgart 1977).

The latices are coagulated by known processes (see e.g. EP 459 161 A2).

Aqueous solutions of water-soluble inorganic or organic acids and/or salts are preferably used as the coagulator, such as hydrochloric acid, sulfuric acid, phosphoric acid, boric acid, formic acid, acetic acid, propionic acid, citric acid, alkali, alkaline-earth, zinc and aluminium chlorides, sulfates, formates, acetates, phosphates and carbonates, aluminates, partially saponified polyvinyl acetates, optionally in combinations with inorganic or organic acids. Depending on the vinyl polymer latex blend to be coagulated, 0.2 to 25 wt. % aqueous solutions are used.

Organic volatile components C) are understood to be monomers and low molecular weight oligomers of the thermoplastic polymers, elastomers or graft polymers that are used (e.g. styrene, acrylonitrile), emulsifier components (e.g. dihydroabietic acid) or secondary polymerization products and solvents used in the production of the graft polymers or thermoplastics (e.g. ethyl benzene, MEK).

The thermoplastic polymer A) used for grafting the elastomer D) may be one of the polymers used as thermplastics B) or a mixture of these polymers. The thermplastics A) may be the same or another polymer than thermoplastics B). The thermoplastics A) is preferably selected from the series comprising styrene-acrylonitrile (SAN) copolymers, polystyrene, polymethyl methacrylate, polyvinyl chloride, polycarbonate, polybutylene terephthalate, polyoxymethylene, polymethyl methacrylate, polyphenylene sulfide, polysulfones, polyether sulfones and polyamides and mixtures of these thermoplastics.

Compounding reactors within the meaning of the invention are reactors having compounding screws for the introduction of mechanical energy into the materials to be mixed, the compounding screws being provided with a number of kneading discs, not necessarily circular, along the length of their shaft. The discs are provided with at least one axially oriented tool that scrapes the perimeter of the housing, known as "kneading bars". The kneading bars are conventionally set at an angle to the longitudinal axis of the machine so that they cause the product to be processed to be transported from the inlet to the outlet. The compounding reactor has at least two inlets for the materials to be mixed/reacted and in its end section an exit for the polymer and an outlet for the vapors that are released. An advantageous arrangement of the inlets and outlets is described in EP-A1-0 867 463.

According to the inventive process, a compounding reactor is used which conveys the plastic material back towards the reactor inlet. In a particularly preferred variant of the process the backward transport by the kneading bars occurs in the exit zone of the compounding reactor.

Surprisingly it was found that light products with low residual monomers may be provided without the disadvantages described above if backward-conveying kneading bars, as is described in more detail below, are fitted to the compounding screws in a mixing compounder for the combining of the melt e.g. of products B) and wet powders of products D). The backward-conveying kneading bars are preferably installed near to the product exit, particularly preferably 15 to 25% of the way along the length of the compounder shaft that is contact with the product from the product exit. In this position the kneading bars installed according to the invention counteract the transport of the product in the machine.

Surprisingly it was found that in spite of the deterioration in the conveyance the throughput may be increased considerably by this measure. An increased power input by the mixing compounder drive allows a larger amount of water to be evaporated.

A further advantage of the higher compounding input is that the temperature at which the apparatus walls are heated may be reduced. Heating takes place at a temperature of 200 to 230° C., preferably 200 to 220° C. The thermal loading on the layers adhering to the walls is therefore reduced. In comparison to the procedure described in EP-A1-0 867 463 it is also possible to use lower speeds, as a result of which the shear stress in the gaps between the kneading bars and the housing wall and between the kneading bars and the rotor facing them may further be reduced significantly. The backward-conveying setting of the kneading bars means that the fittings located upstream are wetted, so the powder is bound and not entrained by the passing flow of water vapor. Residual volatile matter is gently cleaned in the water vapor stream.

Surprisingly it was also found that in addition a gentle pretreatment of wet powders (elastomers D) may be performed in a continuous pressing device at low temperature in such a way that little or no plasticization occurs, so that loss of quality may be avoided. The continuous dewatering is carried out by a screw conveyor known per se, the housing of which is provided with slots for the removal of water. To this end the housing may be constructed from an assembly of rods or may have screening surfaces. Since the polymer is not plasticized in the dewatering zones the water drainage slots do not become blocked.

The invention also provides a compounding reactor, particularly for the performance of the inventive process equipped as a minimum with two axially parallel screws, wherein both screws are provided with discs having kneading bars arranged around their perimeter for conveying the reaction mixture, with a housing enclosing the fittings with at least two inlets and an exit for the product, a means of driving the co-rotating or counter-rotating screws and a heating/cooling system, characterized in that some of the kneading bars are set at an angle to their direction of movement such that when the screws are rotated by the driving means they convey the product away from the exit towards the inlets.

Particularly preferred is a compounding reactor characterized in that the kneading bars on the three to five discs positioned closest to the exit are set at an angle having a backward-conveying effect.

A kneading bar has a backward-conveying effect if the normal vector on its leading edge includes a component opposing the direction of material flow. The leading edge is the side of the kneading bar past which the material flows as a consequence of the rotational movement of the kneading bar.

The invention also provides molding compositions produced from elastomer-modified thermoplastics obtained by an aforementioned process and molded articles produced from these molding compositions.

The screw shaft is provided with either a continuous conveying thread or with a discontinuous thread that is discontinuous at one or more points. At the discontinuities in the thread bolts are then advantageously fitted to the housing, which prevent the powder from rotating with the screw. In order to achieve an even better pressing effect, the free cross-section at the exit from the screw conveyor is partially closed. The free cross-section is preferably reduced by 50 to 95%. This is particularly preferably achieved by a variable flow restrictor in the form of movable sliders or perforated diaphragms. The diameter of the screw root may extend conically at the exit from the screw to increase the retarding effect. Conically converging or narrowing channels outside the screw conveyor zones are preferably avoided. In this way 60 to 85% of the residual water is removed, wherein only 0.016 to 0.05 kWh/kg, preferably 0.018 to 0.03 kWh/kg, of energy per kg of polymer has to be used. The process according to the invention is thus very energy efficient. Starting from an initial moisture content of 25 to 60%, 60 to 85% of the water contained in the wet material is removed. Water contents of 10 to 23% are obtained in powder (elastomers D) without plasticization or with only a very small plasticized proportion.

The pressing according to the invention also leads to a reduction in fine powder and allows a considerable increase in throughput. It contributes to the fact that the process is reliable and that molding compositions that are low in residual monomers and light in color may be produced.

A further advantage of the pressing method according to the invention is a reduction in the content of salts, which derive from polymerization and conventionally have to be removed by washing.

According to the invention some of the homopolymers or copolymers described may be replaced by other thermoplastics. The other thermoplastics are preferably selected from the group comprising polycarbonates, polyester carbonates, polyesters, preferably polyalkylene terephthalates.

The molding compositions according to the invention may also contain other additives selected from the group comprising flame retardants, anti-dripping agents, extremely fine particle inorganic compounds and fillers and reinforcing materials.

Mixtures of rubber-free (thermoplastics B) and rubber-containing vinyl polymers (elastomers D) preferably contain in particular
a. 0.5 to 90 parts by weight, preferably 10 to 80 parts by weight, in particular 25 to 75 parts by weight of B) and
b. 10 to 99.5 parts by weight, preferably 20 to 90 parts by weight, in particular 75 to 25 parts by weight of D) (relative to B) and D), wherein the mixture contains little residual monomer, namely less than or equal to 3 ppm acrylonitrile and less than or equal to 20 ppm vinyl cyclohexene and 20 ppm ethyl benzene and less than or equal to 80 ppm styrene, and has a yellowness index of less than or equal to 30.

Furthermore, particularly suitable mixtures are also those containing B) and D) as well as other thermoplastics and optionally other additives. Other thermoplastics are preferably selected from the group comprising polycarbonates, polyester carbonates, polyalkylene terephthalates, polyamides or mixtures thereof.

The compositions preferably contain
b. 10 to 70 wt. %, in particular 15 to 60 wt. %, most particularly preferably 20 to 40 wt. % of polycarbonate, polyester carbonate, polyalkylene terephthalate or mixtures thereof or polyamide,
c. 90 to 30 wt. %, preferably 85 to 40 wt. %, in particular 80 to 60 wt. % of B) and D), wherein the sum of the percentages by weight of all components is 100, with the proviso that at least one of the components B) and D) or mixtures thereof contain little residual monomer, namely less than or equal to 3 ppm acrylonitrile and less than or equal to 20 ppm vinyl cyclohexene and 20 ppm ethyl benzene and less than or equal to 80 ppm styrene, and have a yellowness index of less than or equal to 30.

Suitable polycarbonates and/or polyester carbonates are known or may be produced by known processes (on the production of aromatic polycarbonates see for example Schnell, "Chemistry and Physics of Polycarbonates", Interscience Publishers, 1964 and DE-A1-3 832 396; on the production of aromatic polyester carbonates e.g. DE-A1-3 077 934).

By virtue of their very good mechanical properties the thermoplastic molding compositions according to the invention are suitable for the production of molded articles of any type, in particular those requiring s enhanced fracture resistance. Molded articles may be produced by injection molding in particular. Examples of molded articles that may be produced are: all types of housing sections, e.g. for domestic appliances such as juice extractors, coffee machines, mixers, for office equipment such as monitors, printers, copiers, or cover plates for the construction sector and parts for the automotive sector. They may also be used in the electrical engineering sector because they have very good electrical properties.

The molding compositions according to the invention may also be used for example for the production of the following moulded articles or moulded parts:
1. Interior fittings for rail vehicles (FR)
2. Hubcaps
3. Housings for electrical appliances containing miniature transformers
4. Housings for equipment for information dissemination and transfer
5. Housings and cladding for medical purposes
6. Massage equipment and housings
7. Toy vehicles for children
8. Two-dimensional prefabricated wall panels
9. Housings for safety equipment
10. Vehicle spoilers
11. Heat-insulated transport containers
12. Equipment for handling or caring for small animals 13. Molded parts for sanitary and bathroom equipment
14. Covering grid plates for ventilator openings
15. Molded parts for garden sheds and tool sheds
16. Housings for gardening equipment Another form of processing is the production of molded articles by thermoforming from prefabricated sheets or films.

The invention is described below in more detail by means of examples and the drawing, which represents only a preferred embodiment.

Figure 2:
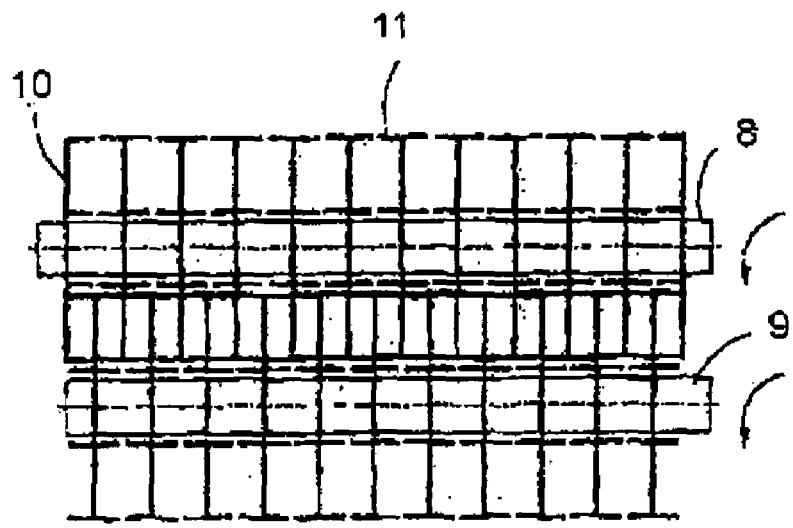
FIG. 2 shows a schematic view of a conventional compounding reactor.
Figure 3:
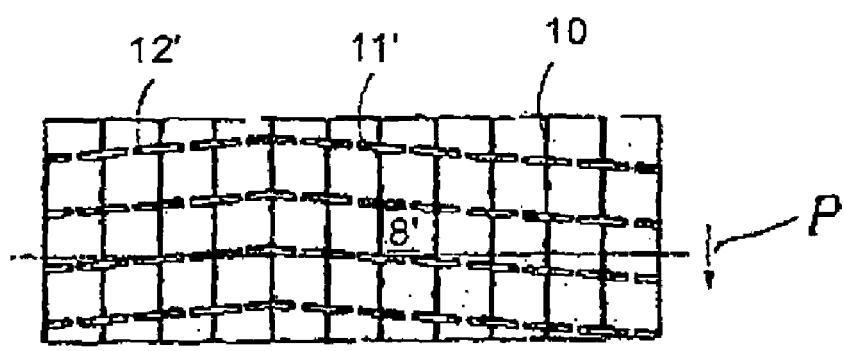
FIG. 3 shows a developed view of a first rotor in a compounding reactor that is suitable for the inventive process.
Figure 4:
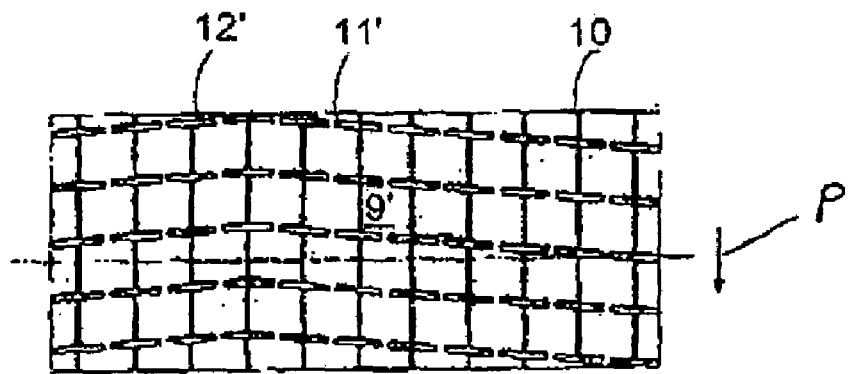
FIG. 4 shows a developed view of the second rotor in the aforementioned compounding reactor.

FIG. 1 shows a schematic view of a preferred design for a strainer screw as a pressing device in longitudinal section, FIG. 2 shows a schematic view of a conventional mixing compounder, FIG. 3 shows a developed view of a first rotor in a mixing compounder that is suitable for the process and FIG. 4 shows a developed view of the second rotor in the aforementioned mixing compounder.

EXAMPLES

Example of component B):

Styrene/acrylonitrile copolymer with a styrene/acrylonitrile ratio of 72:28 and an intrinsic viscosity of 0.55 dl/g (measurement in dimethyl formamide at 20° C.).

Examples for component D):

D/50 (product used for component D/18 used as elastomer D) in the process according to the invention):

Graft polymer of 40 parts by weight of a copolymer produced from styrene and acrylonitrile in the ratio 73:27 on 60 wt. % of particulate crosslinked polybutadiene rubber (average particle diameter $d_{50}$=0.3 µm), produced by emulsion polymerisation. The aqueous latex is precipitated in the conventional way with salts or with acids, the precipitated material is isolated in solid, wet form by filtration with washing. The water content is 50%.

D/30 (product used for production according to the invention of the copolymers):

Graft polymer of 40 parts by weight of a copolymer produced from styrene and acrylonitrile in the ratio 73:27 on 60 wt. % of particulate crosslinked polybutadiene rubber (average particle diameter $d_{50}$=0.3 µm), produced by emulsion polymerisation. The aqueous latex is precipitated in the conventional way with salts or with acids, the precipitated material is filtered, washed with water and centrifuged. The product has a moisture content of 30%.

Example 1 According to the Invention

Production of graft polymer D/18:

The graft polymer D/50 was removed from filtration as a wet product with a water content of 49% and was fed at a rate of 534 kg/h to an Expeller® strainer screw supplied by Anderson International, Cleveland, Ohio, the use of which is preferred and which is shown in FIG. 1. The screw 1 had a diameter of 6 inches. A feed housing 2, 11 inches in length, was followed by a dewatering housing 3, 22 inches in length, which was constructed from rods 4. The pitch of the screw 1 was 4.5 inches at the feed end and was gradually compressed to 2 inches. The root diameter of the screw 1 was 3.25 inches along the entire length of the screw 1. The exit cross-section could be partially closed with sliders 5. At the exit from the screw 1 any coarse material was comminuted by four rotating blades 6 and fixed blades 7.

The screw 1 was operated at a speed of 70 rpm. 215 kg/h of water were pressed out through the slots in the dewatering housing 3. The solids content in the water was <1%. 319 kg/h of dewatered graft polymer with a residual moisture content of 15% were obtained at the nozzle. Most of the polymer left the machine in powder form. It was determined by means of a screen analysis that the plasticized proportion was less than 5%. During processing the temperature of the polymers remained below 50° C.

Production of ABS copolymer:

The graft polymer D/18 dewatered in this way was fed at a rate of 66.2 kg/h to the counter-rotating compounding reactor ORP12 from example 1 of EP-A1-0 867 463 (U.S. Pat. Nos. 6,153,692 and 6,465,570 both incorporated herein by reference) (see comparative example 1). In addition, 18.75 kg/h of the thermoplastic B) were added as a melt at a temperature of 230° C. As in the comparative example 1 the rotors rotated at a speed of 100 and 25 revolutions per minute respectively. The apparatus walls were heated at a temperature of 280° C. The mechanical power input was 7 kW. The product was extruded at a rate of 75 kg/h and a temperature of 225° C. The mechanical power input was more than twice that of the comparative example and the throughput rate was 75% higher.

Comparative Example 1

The example was carried out according to example 1 of EP-A1-0 867 463.

The mechanical power input was 3 kW. Upon increasing the throughput water vapor bubbles appeared in the extruded strand and part of the powder was lost with the vapors.

Example 2 According to the Invention 54.27 kg/h of the graft polymer D/30, which had been partially dewatered using a centrifuge and contained 26.3% water, and 20 kg/h of the thermoplastic melt B) at a temperature of 230° C. were fed to a CRP12 co-rotating compounding reactor.

In the conventional design, which is shown schematically in FIG. 2, the compounding reactor has two co-rotating rotors. Each rotor consists of a heated core screw 8 and 9, each carrying a number of parallel discs 10, wherein on one rotor there are four and on the other rotor there are five kneading bars 11 attached to each disc 10. The rotor speeds are in the inverse ratio. The kneading bars are set at an angle of 5° and 4° respectively to the longitudinal axis of the machine to improve the transport effect of the rotors. In total each rotor has eleven discs 10 carrying kneading bars.

Finally FIGS. 3 and 4 show the arrangement of kneading bars in accordance with the embodiment example according to the invention. They show the developed view of rotors 8' and 9' respectively. In the diagram the direction of product flow is from right to left. The direction of rotation of the rotors is indicated by arrows P. At the eighth disc in the direction of product flow the setting of the kneading bars is reversed from forward-conveying kneading bars 11' to backward-conveying kneading bars 12'. In the original design the forward-conveying kneading bars 11' have an angle of 4° and 5° respectively to the longitudinal axis of the mixing compounder. The backward-conveying kneading bars 12' have for example an angle of 8.75° and 7° respectively to the longitudinal axis of the mixing compounder.

The rotors rotated at a speed of 100 and 80 revolutions per minute respectively. The compounding reactor housing was heated with thermal oil at a temperature of 200° C. The screws were heated when the machine is started up. Then the supply of thermal oil to the screws was shut off. The machine introduced a compounding power input of 0.24 kWh/kg. The product was removed from the mixing compounder at a rate of 60 kg/h and a temperature of 210° C. The operating point displayed long-term stability.

Comparative Example 2

The compounding reactor was used in its conventional design, i.e. all kneading bars were set at a conveying angle of 5° and 4° respectively. 47.26 kg/h of the partially dewatered graft powder D/30 and 16.66 kg/h of the thermoplastic melt B) at a temperature of 230° C. were fed to the compounder. The rotors rotated at a speed of 100 and 80 revolutions per minute respectively. The compounding reactor housing was heated with thermal oil at a temperature of 200° C. The screws were heated when the machine was started up. Then the supply of thermal oil to the screws was shut off. The product was extruded at an average rate of 50 kg/h. Operation however was not stable. After an operating period of approximately 30 minutes gas bubbles appeared in the strand and the graft powder was carried out of the compounder with the water vapor as the plasticization was inadequate.

The invention claimed is:

1. A continuous process for the production of an elastomer-modified thermoplastic comprising
   (i) obtaining graft elastomer D) that includes a grafted phase A), said D) having residual moisture content of 1 to 50 wt. %,
   (ii) partially filling a compounding reactor with the graft elastomer D) and a thermoplastic resin B) through at least one inlet of the compounding reactor and operating the partially filled compounding reactor under conditions calculated to melt D) and B) and to remove organic volatile components C), and
   (iii) collecting a molten blend comprising A), D) and B), said reactor being equipped with a housing having a surface, a plurality of kneading bars that provide kneading action and an exit zone, said kneading bars conveying a portion of the molten blend towards the reactor inlet; and
   wherein the throughput of the molten blend comprising A), D) and B) through the compounding reactor per liter of processing capacity is no more than 5 kg/h.

2. The process of claim 1 wherein the graft elastomer D) is dewatered in at least one of centrifuge and a dewatering extruder.

3. The process of claim 2 wherein the graft elastomer D) is dewatered in a centrifuge and a dewatering extruder connected in series to yield residual moisture content of 10 to 23% relative to the weight of D).

4. The process of claim 1 wherein elastomer D) is selected from the group consisting of butadiene rubber, acrylonitrile-butadiene rubber, styreneacrylonitrile-butadiene rubber.

5. The process of claim 1 wherein said grafted phase A) is at least one member selected from the group consisting of styrene-acrylonitrile copolymer, polystyrene, polymethyl methacrylate, polyvinyl chloride, polycarbonate, polybutylene terephthalate, polyoxymethylene, polymethyl methacrylate, polyphenylene sulfide, polysulfone, polyether sulfone and polyamide.

6. The process according to claim 1 wherein the thermoplastic B) is at least one member selected from the group consisting of styrene-acrylonitrile copolymer, polystyrene, polymethyl methacrylate, polyvinyl chloride, polycarbonate, polybutylene terephthalate, polyoxymethylene, polymethyl methacrylate, polyphenylene sulfide, polysulfone, polyether sulfone and polyamide.

7. The process of claim 1 wherein the conveying by the kneading bars takes place in the exit zone.

8. The method of claim 1, wherein heat energy required to melt D) and B) is introduced by mechanical energy via said kneading action and thermal energy by heating a surface of the housing, at a ratio of mechanical energy to thermal energy of 4:1 to 1:6.

* * * * *